United States Patent
Desain et al.

(10) Patent No.: US 7,177,871 B1
(45) Date of Patent: Feb. 13, 2007

(54) METHOD AND SYSTEM FOR PROVIDING COMMUNICATION VIA A NETWORK

(75) Inventors: Petrus Wilhelmus Maria Desain, Corduwenerstraat 12, NL-6523 HW Nijmegen (NL); Cornelis Maria Jansen, Nijmegen (NL)

(73) Assignee: Petrus Wilhelmus Maria Desain, Nijmegen (NL)

( * ) Notice: Subject to any disclaimer, the term of this patent is extended or adjusted under 35 U.S.C. 154(b) by 393 days.

(21) Appl. No.: 10/312,159

(22) PCT Filed: Jun. 19, 2000

(86) PCT No.: PCT/NL00/00425

§ 371 (c)(1),
(2), (4) Date: Mar. 27, 2003

(87) PCT Pub. No.: WO01/99383

PCT Pub. Date: Dec. 27, 2001

(51) Int. Cl.
*G06F 17/30* (2006.01)
*G06F 7/00* (2006.01)

(52) U.S. Cl. ............ 707/10; 707/104.1; 709/201

(58) Field of Classification Search ............ 707/3–5, 707/10, 100–204; 709/217, 219, 204–205, 709/224, 201, 203; 715/500.1, 513; 704/240; 711/124
See application file for complete search history.

(56) References Cited

U.S. PATENT DOCUMENTS

| | | | | |
|---|---|---|---|---|
| 5,787,470 A | * | 7/1998 | DeSimone et al. | 711/124 |
| 5,954,798 A | * | 9/1999 | Shelton et al. | 709/224 |
| 6,006,221 A | * | 12/1999 | Liddy et al. | 707/5 |
| 6,035,332 A | * | 3/2000 | Ingrassia et al. | 709/224 |
| 6,175,842 B1 | * | 1/2001 | Kirk et al. | 715/513 |
| 6,240,444 B1 | * | 5/2001 | Fin et al. | 709/205 |
| 6,374,217 B1 | * | 4/2002 | Bellegarda | 704/240 |
| 6,438,564 B1 | * | 8/2002 | Morton et al. | 715/500 |
| 6,687,739 B2 | * | 2/2004 | Anupam et al. | 709/204 |
| 6,874,024 B2 | * | 3/2005 | Cohen et al. | 709/224 |
| 7,003,550 B1 | * | 2/2006 | Cleasby et al. | 709/205 |
| 7,035,926 B1 | * | 4/2006 | Cohen et al. | 709/225 |
| 7,051,017 B2 | * | 5/2006 | Marchisio | 707/3 |

FOREIGN PATENT DOCUMENTS

GB 2327787 A 2/1999

OTHER PUBLICATIONS

Jacobs, S. et al., "Filling HTML Forms Simultaneously: Co Web-Architecture and Functionality," May 1, 1996, pp. 1385-1395, vol. 28, No. 11, North Holland Publishing, Amsterdam.

* cited by examiner

*Primary Examiner*—Greta Robinson
*Assistant Examiner*—Jacques Veillard
(74) *Attorney, Agent, or Firm*—The Webb Law Firm

(57) ABSTRACT

Method and server system for providing communication between a first user and at least one further user comprising the steps of sending a page comprising information to a first client computer for presentation to the first user, receiving a selection from the page from the first client computer, and sending information associated with the selection to at least one further client computer for presentation to a further user. In a further embodiment the method comprises the further steps of: sending a further page comprising further information associated with the selection to the at least one further client computer for presentation to the user, receiving a further selection from the further page, and sending information associated with the further selection to the first client computer for presentation to the first user.

15 Claims, 1 Drawing Sheet

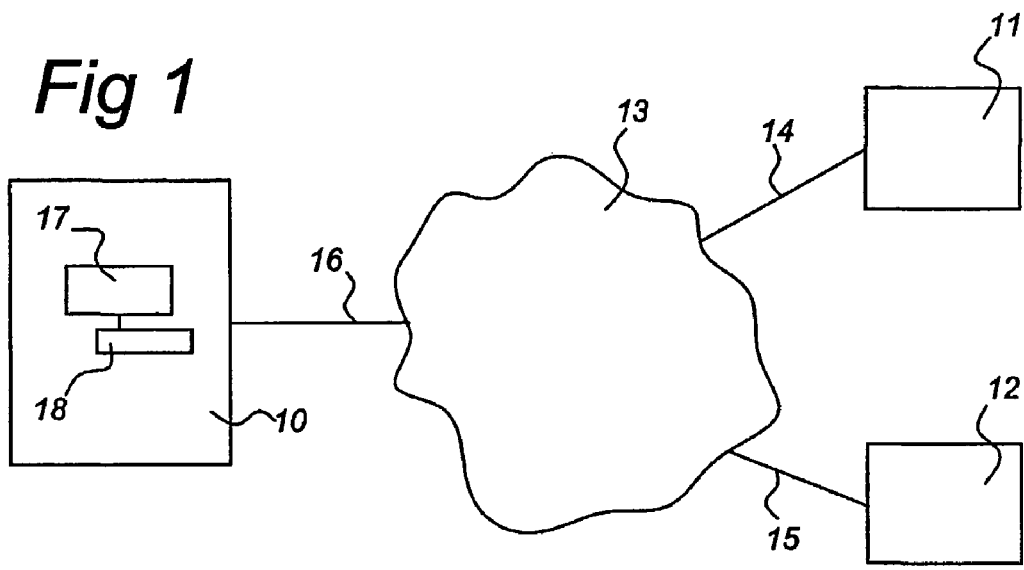
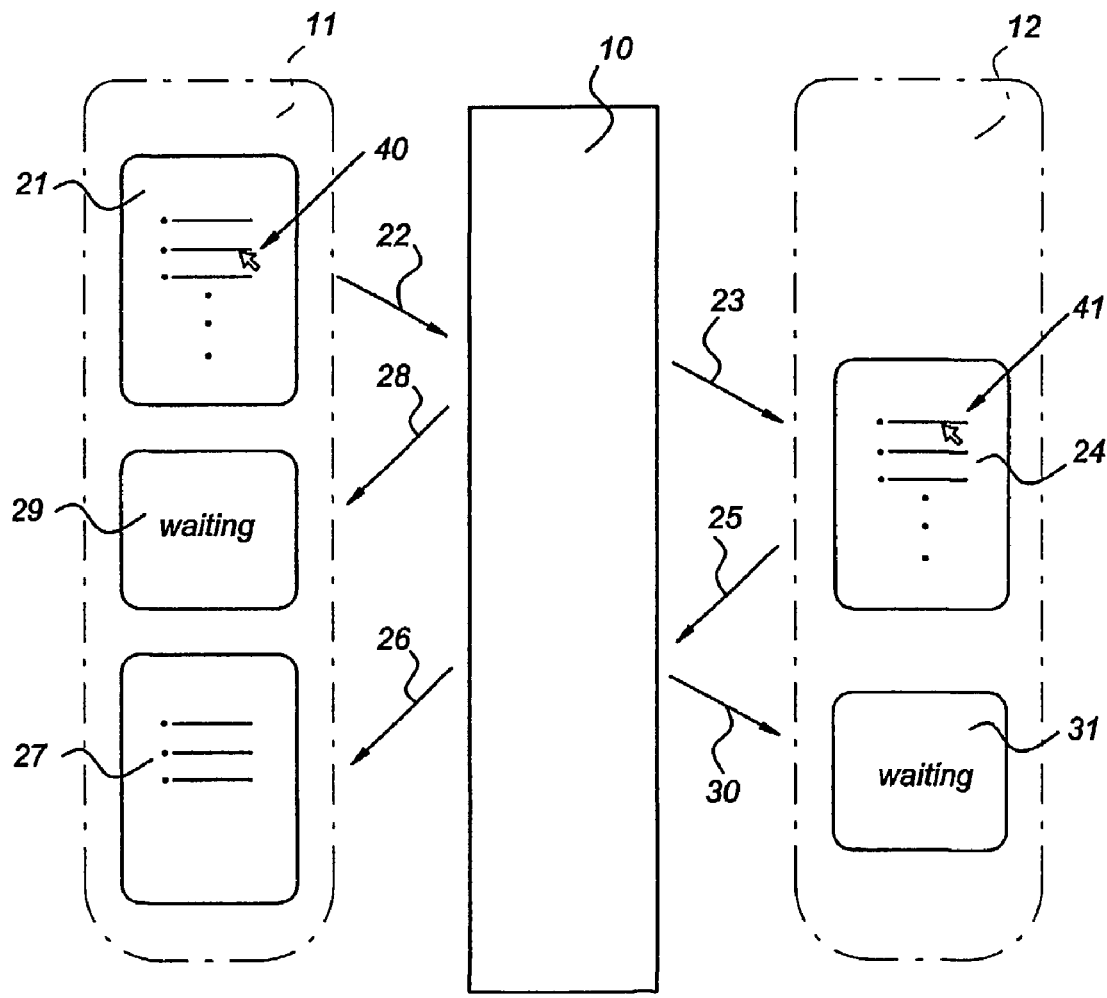

METHOD AND SYSTEM FOR PROVIDING COMMUNICATION VIA A NETWORK

BACKGROUND OF THE INVENTION

The present invention relates to a method for providing communication between a first user and at least one further user comprising the steps of sending a page comprising information to a first client computer for presentation to the first user, receiving a selection from the page from the first client computer, sending information associated with the selection to at least one further client computer for presentation to a further user, sending a further page comprising further information associated with the selection to the at least one further client computer for presentation to the user, receiving a further selection from the further page from the at least one further client computer, and sending information associated with the further selection to the first client computer for presentation to the first user.

The article of S. Jacobs et al., 'Filling HTML forms simultaneously: Coweb—architecture and functionality', Computer Networks and ISDN systems, Amsterdam, The Netherlands, vol: 28, no 11, May 1, 1996, pages 1385–1395, describes such a method and associated system. The article describes a method and system for simultaneously viewing and using HTML documents by replacing HTML units by Java applets, which render a co-operative functionality to the document. This may be applied e.g. in the field of medicine, software development and administration. It is specifically aimed at working together by a number of people in one and the same document.

The standard manner of web browsing on a network such as the Internet is by accessing passive pages constructed used hypertext mark-up language (HTML) or some other page layout standard. These pages allow a user to follow hyperlinks in order to select which page is to be displayed next. This is not an actual interactive manner of communication, but merely a search through content in various media assisted by computer. Even when a web browser is used to access an active computer program running on the server dynamically calculating the web pages, such as by using forms, CGI-scripts and/or Java applets, the interaction is limited to that program on the server. Usually this program comprises only a restricted domain of information and a restricted format of input and output. This standard use of Internet and HTML formatted pages is restricted to receiving requests from a user by a server and subsequent downloading of the requested page to the user. This does not allow true interaction between multiple users.

It is further known to use the Internet for interactive communication between two humans by using chat programs such as Internet Relay Chat. These programs provide an interaction between two users in natural language, and the domain of information conferred is not restricted but determined by the users. However, the mode of interaction is restricted to typing sentences only and waiting for the other party to respond, which is rather slow and eliminates the use of other formats of information.

Likewise, the use of the short message service (SMS) capability of mobile phones, which is a further alternative, is rather cumbersome because of the difficult typing on a telephone keypad.

The present invention seeks to provide a method for allowing true interactive communication via the Internet between at least two users, allowing full use of existing and future technology.

SUMMARY OF THE INVENTION

This is achieved by a method in which information and further information are stored in a database, and the database comprises a graph of dialogue items and associated possible further dialogue items. The information associated with the (further) selection may be a representation of the selection itself, or information, which is (dynamically) associated with the selection, such as a web page, associated with a hyperlink.

This method allows a user to make a selection on a certain page, such that the page associated with the selection is presented to the further user, instead of being downloaded to be presented to the user himself. This embodiment allows a kind of dialogue to be executed between the first user and the further user in a semi-structured manner. The database storage of the dialogue items allows a semi-structured manner of communicating between the first user and a further user.

Preferably, the communication is supported by means of a first web browser application running on the first client computer and a further web browser application running on the at least one further client computer. Standard web browsers allow the use of various types of page layouts an page items. Information or items on a page may comprise text, sound, graphics, and/or video. These items, preferably, form dialogue items to allow a semi-structured manner of communication between the first user and the at least one further user. In an embodiment, the page and further page comprise hyperlinks.

In a further embodiment, the database comprises a graph of dialogue items and associated possible further dialogue items in at least one language, the language being separately selectable by the first user and the at least one further user. This allows for a communication to take place between the first user and a further user, in which the language of communication may be different for the first user and the further user.

In a further embodiment of the present invention, it is possible for the first user or the further user to add dialogue items or other information to the database. This is accomplished by the further steps of receiving a new dialogue item from the first client computer or the at least one further client computer, and adding the new dialogue item to the database. Preferably, the method further comprises the step of linking one of the dialogue items to other dialogue items in the graph. New dialogue items may be linked to existing items in the graph by searching for semantic associations with dialogue items already present in the graph. In this manner, it will be possible to dynamically enlarge the content of the database with dialogue items.

In a further, preferred embodiment, the method comprises the further step of collecting statistic properties of the dialogue items. By collecting statistical properties, it will be possible to order the database according to the statistical properties of the dialogue items. E.g., dialogue items (questions or associated answers, remarks) may be ordered such that items which have been selected most frequently in the past are put first. This will result in a dynamically changing database, in which the most likely communication will be presented first, and unused items may even be deleted after a predetermined period of time. As an alternative, the database may be ordered according to a stochastic model of previous selections, such as a Markov model of previous answers.

In a further aspect, the present invention relates to a server system comprising processor means and memory means connected to the processor means, in which the processor means and memory means are arranged to execute the method according to the present invention, the server system, a first client computer and at least one further client computer being arranged to communicate with each other by means of a network, such as the Internet. The present method may, e.g., be executed on a server computer of an Internet Service Provider or a host computer of a firm delivering a communication service according to the present method.

In an even further aspect, the present invention relates to a computer program product comprising computer executable instructions, providing a computer with the functionality of the method according to the present invention. Finally, the present invention relates to a data carrier provided with such a computer program product.

BRIEF DESCRIPTION OF THE DRAWINGS

The present invention will now be further discussed in detail by means of an exemplary embodiment, with reference to the accompanying drawing, in which FIG. 1 shows a schematic representation of a system for executing the method according to the present invention; and FIG. 2 shows a time line representing data exchange between a server and multiple client computers embodying the method according to the present invention.

DETAILED DESCRIPTION OF THE INVENTION

FIG. 1 shows a schematic representation of the Internet 13, or any other communication network, interconnecting a server 10 and multiple client computers 11, 12. The client computer 11 and further client computer 12 may be connected to the Internet 13 directly, or via an Internet service provider. The Internet service provider is a server computer having a direct connection to the Internet 13, the client computers 11, 12 being connected to the Internet service provider by means of, e.g., a telephone connection or a LAN connection. Use of the term "further" with respect to a client computer is to be understood to refer to a second client computer or any additional client computers (e.g., multiple client computers 11, 12) that may be communicatively connected to the server 10.

A user of a client computer 11 may use a web browser to surf the Internet. The user can contact the server 10 via the Internet and request the download of a page comprising information. The page may comprise an HTML formatted page and may e.g. comprise images, text and hyperlinks. The hyperlinks allow the user to select a request for a further page, which after selection of the hyperlink will be downloaded to the client computer 11. The hyperlinks may also refer to other information types, such as sound files, images, video files, etc. Use of the term "further" with respect to a page is to be understood to refer to a next page or a page that has different content.

The normal use of HTML formatted pages allows a user to download all kinds of information, e.g. by following hyperlinks. However, it is not possible to interactively communicate with a user of a further client computer 12. Interaction may be provided by an active computer program running on the server, e.g. by using forms, CGI-scripts and/or Java. In that case, the interaction between the user and the program is limited to that program, which usually exhibits a restricted domain and format of input/output. Use of the term "further" with respect to a selection is to be understood to refer to a next selection or a selection that is associated with the next page.

According to the present invention, a method is provided for providing communication between at least two users of client computers in a semi-structured way using the Internet, allowing use of all technological possibilities of providing information, e.g. by plain text, images, animated images, video and/or sound.

The major idea underlying the present invention is that a page comprising information is not downloaded to a client computer 11 of the user who selected a request for information, but is instead downloaded to a further client computer 12 for display to a further user. By showing information on each page in the form of multiple choice selections, a semi-structured manner of communication is formed between the user and the further user. This is depicted in FIG. 2, which shows a time sequence of pages displayed on the client computer 11 and the further client computer 12 via the server computer 10.

In FIG. 2, a timeline is shown of pages presented on the first client computer 11 and the further client computer 12, and the communication between the first client computer 11 and the further client computer 12, respectively, and the server computer 10 is indicated by arrows. A first page 21 is displayed on the first client computer 11, comprising one or more possible selections. The user may select one of the items on the first page 21 by moving his mouse pointer 40 to the item and executing a selection, e.g., by clicking a mouse button. This results in a first request 22 being sent to the server computer 10. On receiving the request from the first client computer 11, the server does not download the requested page 24 to the first client computer 11, but to the further client computer 12 (arrow 23). The page 24 displayed then may also comprise one or more possible selections, of which one may be selected by the further user of the further client computer 12, e.g., by moving his mouse pointer 41 to the item to be selected and clicking on this section. This results in a further request 25 being sent to the server 10, which will then download a further requested page 27 to the client computer 11 (arrow 26). This further requested page 27 may also comprise a number of selectable items.

In an alternative embodiment, the server 10 will also send intermediate pages 29, 31 to the client computer 11 and further client computer 12, respectively. These intermediate pages 29, 31 may comprise information which indicates that the requested information has been sent to the other user and that the server 10 is now waiting for a further selection by the other user. It is also possible that the information on intermediate pages 29, 31 comprises the same information as will be shown to the other user, in order to achieve a positive feedback of a selection. Preferably the information is then shown in a different style or typeface to indicate that this information is shown to the other user. This may also be accomplished by presenting this information in a separate window.

The server 10 may be a general purpose computer or a special server computer, comprising processing means 17, such as a central processing unit or an array of processing units, and memory means 18, which may be in the form of volatile working memory, such as RAM, or non-volatile memory, such as a hard disk or other means of mass storage memory. The memory means 18 may comprise a database formed by the pages 21, 24, 27 on the server 10, e.g. as a set of HTML pages. By using the hypertext mark-up language format, not only text can be displayed on the pages 21, 24, 27, but also other media (sound, graphics, animation) and layout (fonts, tables, etc.). Alternatively, the database only comprises references to the pages 21, 24, 27, e.g. by means of hyperlinks or URL's. In this way, the pages 21, 24, 27 may themselves be physically stored at other physical locations.

In a preferred embodiment, the database in the memory means 18 is a multiple database, comprising the pages 21, 24, 27 in multiple languages. In this embodiment, the user may select the language in which the pages 21, 24, 27 should be displayed on his client computer 11, 12. The languages may than be different for each of the users of the client computer 11 and further client computer 12. This allows one user to view the first page 21 in e.g. English and make a selection in English, while the further user will see the page 24 displayed on the further client computer 12 in another language, e.g. German. In this manner, the server 10 allows adaptation to the individual needs of each user, such that the users are able to communicate across the language barrier without even being aware of it.

Preferably, the database in the memory means 18 of the server computer 10 is updated dynamically. The information on a page 21, 24, 27 may comprise dialogue items to be selected, but also a free dialogue item input. The free dialogue input may comprise simple text, but also any other format of Internet page content, such as audio, images or movies.

The database is preferably organised as a graph existing of dialogue items with the possible further dialogue response alternatives. The users of the client computer 11 and further client computer 12 are, as it were, walking through the database graph by selecting the chosen dialogue items.

In an embodiment, the user of the client computer 11 or the further client computer 12 may input a free dialogue item when he cannot find a suitable reply among the dialogue items presented. This inputted dialogue item may be added to the graph in the database, through which the size of the database will increase.

In a further embodiment, the server computer 10 is arranged to collect statistical data with regard to the use of the dialogue items in the database. This allows the server computer 10 to discard dialogue items in database pages on the basis of their usage, e.g. being selected less than a predetermined number of times, thereby keeping the size of the database within certain limits. It is also possible to filter out bad dialogue items and dynamically adapt the database to a changing user population. In this manner, only the good and interesting parts of communication will survive and remain in the database.

The statistics concerning use of dialogue items in the database may also be of use to the company running the present method on the server computer 10.

The dialogue items presented on the pages 21, 24, 27 to the users may be ordered according to frequency of use of the dialogue items on the pages, but also, the order may be personalised in order to reflect the frequency of use by (other) users who have been following the same path through the graph. With the use of a stochastic model (e.g. a Markov model), the alternative dialogue items presented to the users will better fit the contents of the ongoing discussion without the need to maintain any state information.

The newly added dialogue items in the database may be inserted at the current location in the graph. Alternatively, any dialogue item may be linked to existing items in the graph. This may be done by a human operator, using search tools, or this may be accomplished automatically by the method according to the present invention by searching for related dialogue items already present in the graph. The automatic linking may be accomplished using a measure of overlap of corresponding words or semantic associations.

The usefulness of the automatically found links between newly added and existing dialogue items is of course dependent on the quality of the association. Improvements in technology will result in higher quality of the association and thus in better and more useful alternatives for the user to choose from.

In an alternative embodiment, not all alternatives of dialogue items on a page 21, 24, 27 are displayed on the client computers 11, 12, at once. The presentation time of alternative dialogue items may be controlled, such that frequently occurring or likely dialogue items are presented first and for a longer time than less likely dialogue items of hard to find associations. As a further alternative, the duration of presentation of alternative dialogue items may be controlled, such that an attractive and smart dialogue item is presented for a short time, increasing the game-like attractiveness of the interaction between the user of the client computer 11 and the user of the further client computer 12.

The method according to the present invention may be used concurrently with other, known, manners of exchange of information, such as chatting or browsing via the Internet.

The method according to the present invention may be used for various applications.

A first application may be the functionality of a helpdesk. The method can be used for the design of dialog systems that alternate between man-computer communication and man—man communication for finding the right answer to the problem of a customer. The first part of a dialogue may then comprise a standard tree of questions of information for the customer, the middle part may be an interaction with an expert to decide on the question and answer, and the last part could again comprise standard web browsing concerning material about the solution to the problem of the customer. The operator/expert of the helpdesk may easily be involved in multiple conversations at once. It also allows an automatic and continuous build-up of a database that reflects the communication needs of a group of customers and points to issues that the user may need to be informed on, or whether a standard answer can be provided directly. The most frequently asked questions (FAQ) will automatically drift to the top in the embodiment discussed above.

A further application may be to the use of mobile browsing, e.g. by using a webphone using the Wireless Application Protocol (WAP). As to date, these web phones have only limited display screen size and limited keyboard capabilities for typing. The present method may provide a database with small standard dialogs allowing easy communication via the web phone. The present method provides an easy alternative to exchanging short messages using a short message service (SMS) technique and may be integrated with that technique.

Also, games may be played using the method according to the present invention, in the form of adventure like, multi-user, multi-lingual story construction (or cartoon construction). Alternatively, board and card games may be played when the database comprises a list of all possible moves.

Handicapped persons may use the method according to the present invention by providing a database with possible selections of items that make sense in the context of the personalised domain of daily care, without the need of typing.

The method according to the present invention may provide revenue for the owner or operator of the server computer 10 by displaying a commercial banner above each page displayed. This will allow the company running the server computer 10 to keep the use of the method for communication between users free of charge. Users that contribute to the formation of the database, either by adding dialogue items to the database, or by providing translations of parts of the database, may receive a reward for their contributions. The payment may depend on the number of times a contributed selection is selected by another user. This will stimulate good and funny contributions. As the payment may be handled automatically by e.g., a banner providing company, the company running the server computer 10 need not deal with that. Contributors should then subscribe to the banner providing company and supply their contribution to the server computer 10. The banner providing companies usually maintain more levels of referral, and this allows for, smaller, payments to the company running the server computer 10, next to the payments to the contributors.

The invention claimed is:

1. A method for providing communication between a first user and a second user comprising the steps of:
    sending a page comprising information to a first client computer for presentation to the first user;
    receiving a selection from the page from the first client computer;
    sending information associated with the selection to a second client computer for presentation to a second user;
    sending a next page comprising further information associated with the selection to the second client computer for presentation to the second user, wherein the next page presented to the second user is different from the page presented to the first user;
    receiving a next selection from the next page from the second client computer; and
    sending information associated with the next selection to the first client computer for presentation to the first user, wherein the information and further information are stored in a database, and the database comprises a graph of dialogue items and associated possible dialogue items.

2. The method according to claim 1, wherein the communication is supported by means of a first web browser application running on the first client computer and a further web browser application running on the second client computer.

3. The method according to claim 1, wherein the information comprises text, sound, graphics, and/or video.

4. The method according to claim 1, wherein the page and next page comprise dialogue items.

5. The method according to claim 1, wherein the page and next page comprise hyperlinks.

6. The method according to claim 1, wherein the database comprises a graph of dialogue items and associated possible dialogue items in at least one language, the language being separately selectable by the first user and the second user.

7. The method according to claim 1, wherein the method further comprises the steps of:
    receiving a new dialogue item from the first client computer or the second client computer; and
    adding the new dialogue item to the database.

8. The method according to claim 7, further comprising the step of linking one of the dialogue items to other dialogue items in the graph.

9. The method according to claim 8, wherein the new dialogue items are linked to existing items in the graph by searching for semantic associations with dialogue items in the graph.

10. The method according to claim 1, further comprising the step of collecting statistic properties of the dialogue items.

11. The method according to claim 10, further comprising the step of ordering the database according to the statistical properties of the dialogue items.

12. The method according to claim 10, further comprising the step of deleting dialogue items based on frequency of occurrence.

13. The method according to claim 1, wherein the database is ordered according to a stochastic model of previous selections.

14. A server for providing communication between a first user of a first client computer and a second user of a second client computer, wherein the server is configured to communicate with the first and second client computers via a network, wherein the server comprises:
    memory means; and
    processor means connected to the memory means, wherein the processor means is operative for:
        sending a page comprising information to the first client computer for presentation to the first user;
        receiving a selection from the page from the first client computer;
        sending information associated with the selection to the second client computer for presentation to the second user;
        sending a next page comprising further information associated with the selection to the second client computer for presentation to the second user, wherein the next page presented to the second user is different from the page presented to the first user;
        receiving a next selection from the next page from the second client computer; and
        sending information associated with the next selection to the first client computer for presentation to the first user, wherein the information and further information are stored in a database, and the database comprises a graph of dialogue items and associated possible dialogue items.

15. A computer readable medium having stored thereon instructions which, when executed by a processor, cause the processor to:
    send a page comprising information to a first client computer for presentation to a first user thereof;
    receive a selection from the page from the first client computer;
    send information associated with the selection to a second client computer for presentation to a second user thereof;
    send a next page comprising further information associated with the selection to the second client computer for presentation to the second user, wherein the next page presented to the second user is different from the page presented to the first user;
    receive a next selection from the next page from the second client computer; and
    send information associated with the next selection to the first client computer for presentation to the first user, wherein the information and further information are stored in a database, and the database comprises a graph of dialogue items and associated possible dialogue items.

* * * * *